United States Patent
Egashira et al.

(10) Patent No.: US 12,500,286 B2
(45) Date of Patent: Dec. 16, 2025

(54) BATTERY MODULE COMPRISING SIDE SEPARATOR WITH A BIASING PORTION

(71) Applicant: SANYO Electric Co., Ltd., Osaka (JP)

(72) Inventors: Takuya Egashira, Hyogo (JP); Hiroshi Takata, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 1106 days.

(21) Appl. No.: 17/428,018

(22) PCT Filed: Dec. 9, 2019

(86) PCT No.: PCT/JP2019/048020
§ 371 (c)(1),
(2) Date: Aug. 3, 2021

(87) PCT Pub. No.: WO2020/166182
PCT Pub. Date: Aug. 20, 2020

(65) Prior Publication Data
US 2022/0013827 A1    Jan. 13, 2022

(30) Foreign Application Priority Data
Feb. 12, 2019  (JP) .................. 2019-022829

(51) Int. Cl.
| | |
|---|---|
| *H01M 10/6554* | (2014.01) |
| *H01M 10/613* | (2014.01) |
| *H01M 10/625* | (2014.01) |
| *H01M 10/647* | (2014.01) |
| *H01M 10/653* | (2014.01) |
| *H01M 50/209* | (2021.01) |

(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC ........... H01M 10/6554; H01M 10/613; H01M 10/647; H01M 10/653; H01M 50/209;
(Continued)

(56) References Cited

U.S. PATENT DOCUMENTS

2016/0260946 A1    9/2016  Ochi et al.
2017/0244075 A1*   8/2017  Yuasa .................. H01G 11/78
(Continued)

FOREIGN PATENT DOCUMENTS

| JP | 2015-082391 A | 4/2015 |
| JP | 2019-009084 A | 1/2019 |

(Continued)

OTHER PUBLICATIONS

EPO machine generated English translation of KR 2001-0106801A (Year: 2001).*

(Continued)

*Primary Examiner* — Basia A Ridley
*Assistant Examiner* — Kimberly Wyluda
(74) *Attorney, Agent, or Firm* — WHDA, LLP

(57) ABSTRACT

Battery module includes: battery stack including a plurality of batteries; constraining members made of metal and each having flat surface portion extending in stacking direction of batteries along battery stack, constraining members sandwiching the plurality of batteries in stacking direction; and side separators that insulate constraining members and battery stack from each other. Side separator includes: first portion interposed between battery stack and flat surface portion; and biasing portions that protrude toward battery stack from one end portion region of first portion in a first direction that is an in-plane direction of flat surface portion and intersect with stacking direction, and bias the plurality of batteries toward the other end portion region of first portion in the first direction.

7 Claims, 10 Drawing Sheets

(51) Int. Cl.
*H01M 50/244* (2021.01)
*H01M 50/264* (2021.01)
*H01M 50/289* (2021.01)
*H01M 50/291* (2021.01)
*H01M 50/55* (2021.01)
*H01M 50/588* (2021.01)
*H01M 50/593* (2021.01)
*H01M 10/6556* (2014.01)

(52) U.S. Cl.
CPC ....... *H01M 10/647* (2015.04); *H01M 10/653* (2015.04); *H01M 50/209* (2021.01); *H01M 50/244* (2021.01); *H01M 50/264* (2021.01); *H01M 50/291* (2021.01); *H01M 50/588* (2021.01); *H01M 50/593* (2021.01); *H01M 10/6556* (2015.04); *H01M 50/289* (2021.01); *H01M 50/55* (2021.01); *H01M 2220/20* (2013.01)

(58) Field of Classification Search
CPC ............. H01M 50/264; H01M 50/244; H01M 50/593; H01M 50/289; H01M 50/55
See application file for complete search history.

(56) References Cited

U.S. PATENT DOCUMENTS

| | | |
|---|---|---|
| 2018/0138559 A1 | 5/2018 | Omura |
| 2019/0006643 A1 | 1/2019 | Sakurai |
| 2020/0251768 A1* | 8/2020 | Tajima .............. H01M 10/0481 |
| 2020/0411922 A1* | 12/2020 | Kuramitsu .......... H01M 50/209 |
| 2021/0013467 A1 | 1/2021 | Sasaki et al. |

FOREIGN PATENT DOCUMENTS

| | | | |
|---|---|---|---|
| JP | 2019-169373 A | | 10/2019 |
| KR | 2001-0106801 A | * | 12/2001 |
| WO | 2016/174855 | | 11/2016 |

OTHER PUBLICATIONS

International Search Report of PCT application No. PCT/JP2019/048020 dated Mar. 10, 2020.
Office Action dated Jan. 23, 2023, issued in counterpart IN Application No. 202147035576, with English translation. (6 pages).

* cited by examiner

FIG. 9
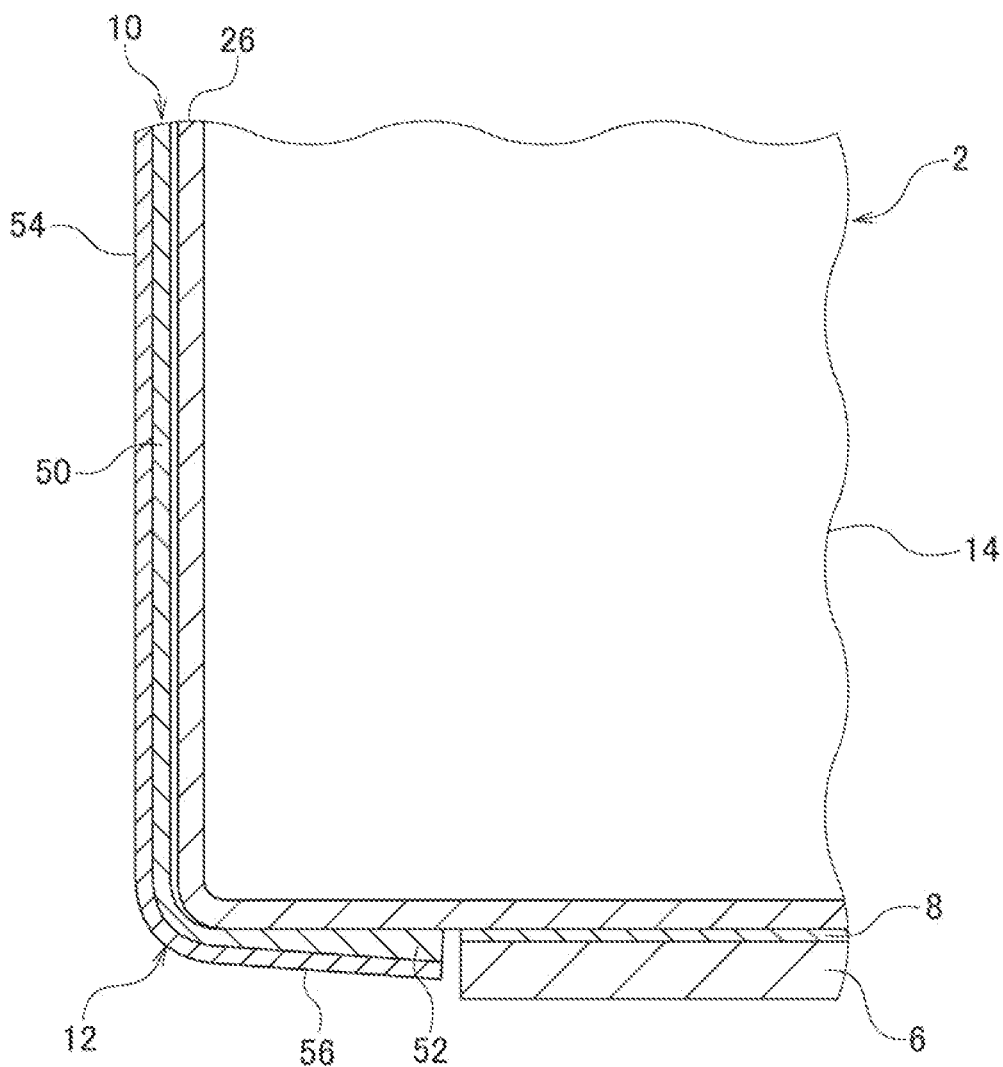
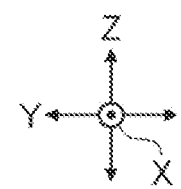

BATTERY MODULE COMPRISING SIDE SEPARATOR WITH A BIASING PORTION

CROSS-REFERENCE TO RELATED APPLICATIONS

This application is a U.S. national stage application of the PCT International Application No. PCT/JP2019/048020 filed on Dec. 9, 2019, which claims the benefit of foreign priority of Japanese patent application No. 2019-022829 filed on Feb. 12, 2019, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. With respect to such a battery module, Patent Literature 1 discloses a battery module that includes: a battery stack including a plurality of batteries that are stacked to each other; a pair of end plates disposed at both ends of the battery stack in a stacking direction of the batteries; a bind bar extending between the pair of end plates to constrain the plurality of batteries in the stacking direction; and a cooling plate connected to a bottom surface of the battery stack.

CITATION LIST

Patent Literature

PTL 1: WO 2016/174855 A

SUMMARY OF THE INVENTION

In the battery module, it is desirable that a state be maintained where respective batteries are positioned with high accuracy to ensure the electrical connection between the respective batteries. As a method of suppressing the positional deviations of the respective batteries, it is considered that a constraining force generated by the bind bars is increased. In general, however, the batteries tend to expand with use. When the batteries expand in a state where the battery stack is constrained by the bind bar, a load is applied to the respective batteries. In a case where this load becomes excessively large, the battery may be damaged. On the other hand, in a case where a constraining force generated by the bind bars is suppressed so as to prevent an excessively large load caused by expansion from being applied to the batteries, the positional deviations are likely to occur in the respective batteries. In particular, when expansion amounts of the batteries are small, the batteries are likely to be deviated in the direction orthogonal to the stacking direction.

In a case where the battery module is mounted on a vehicle, positional deviations of the batteries are more likely to occur due to vibration of a vehicle. Further, in recent years, battery modules are required to further increase their capacities. In order to satisfy such requirement, the development of batteries having higher capacities has been in progress. When a capacity of a battery increases, there is a tendency that an expansion amount of the battery increases. In a case where the size of the bind bar is designed in consideration of an increase in an expansion amount, positional deviation is more likely to occur when the expansion of the battery is low.

The present invention has been made under such circumstances, and it is an object of the present invention to provide a technique for suppressing positional deviations of batteries while suppressing an increase in a load applied to the batteries.

According to one aspect of the present invention, there is provided a following battery module. The battery module includes: a battery stack including a plurality of batteries that are stacked to each other; a constraining member made of metal and having a flat surface portion extending in a stacking direction of the batteries along the battery stack, the constraining member sandwiching the plurality of batteries in the stacking direction; and a side separator having an insulating property and insulating the constraining member and the battery stack from each other. The side separator includes: a first portion extending in the stacking direction along the battery stack and being interposed between the battery stack and the flat surface portion; and a biasing portion protruding toward a battery stack from one end portion region of the first portion in a first direction that is an in-plane direction of the flat surface portion and intersecting with the stacking direction, the biasing portion biasing the plurality of batteries toward another end portion region of the first portion in the first direction.

Any combinations of the above-described constituent elements, and configurations that are obtained by expressing the present invention in the form of method, apparatus, system and the like are also effective as aspects of the present invention.

According to the present invention, it is possible to suppress positional deviation of a battery while suppressing an increase in a load applied to the batteries.

BRIEF DESCRIPTION OF DRAWINGS

FIG. 9 is an enlarged cross-sectional view illustrating a region including a cooling plate of a battery module according to a first modification.

DESCRIPTION OF EMBODIMENT

Hereinafter, the present invention will be described based on a preferred exemplary embodiment with reference to the drawings. The exemplary embodiment is an exemplification and does not limit the invention. All technical features described in the exemplary embodiment and combinations of these technical features are not always essential to the invention. The same reference symbols are assigned to the identical or equivalent constituent elements, members and processes illustrated in the respective drawings. Repeated explanation of the identical or equivalent constituent elements, members, and processes is omitted when necessary. Scales or shapes of respective portions illustrated in the respective drawings are set for convenience sake to facilitate the description of the portions. The scales or shapes of the portions should not be construed as limitation unless otherwise specified. Further, in a case where terms such as "first", "second", and the like are used in the present description and claims, these terms do not mean any order or the degree of importance unless otherwise specified, and are intended to be used to distinguish one configuration and another configuration from each other. Further, in each drawing, some of members that are not important for describing the exemplary embodiment are omitted.

Figure 1:
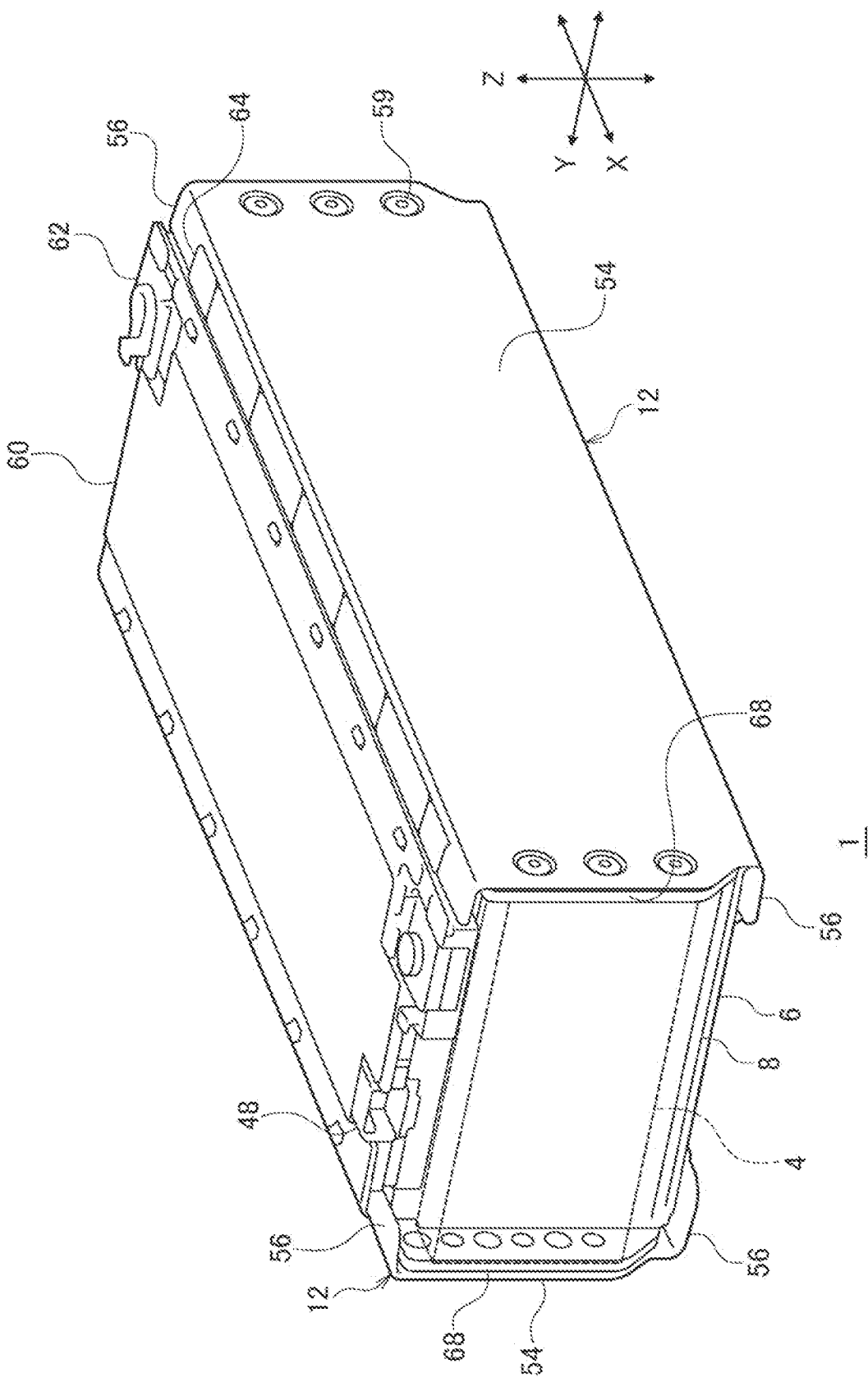
FIG. 1 is a perspective view of a battery module according to an exemplary embodiment.
Figure 2:
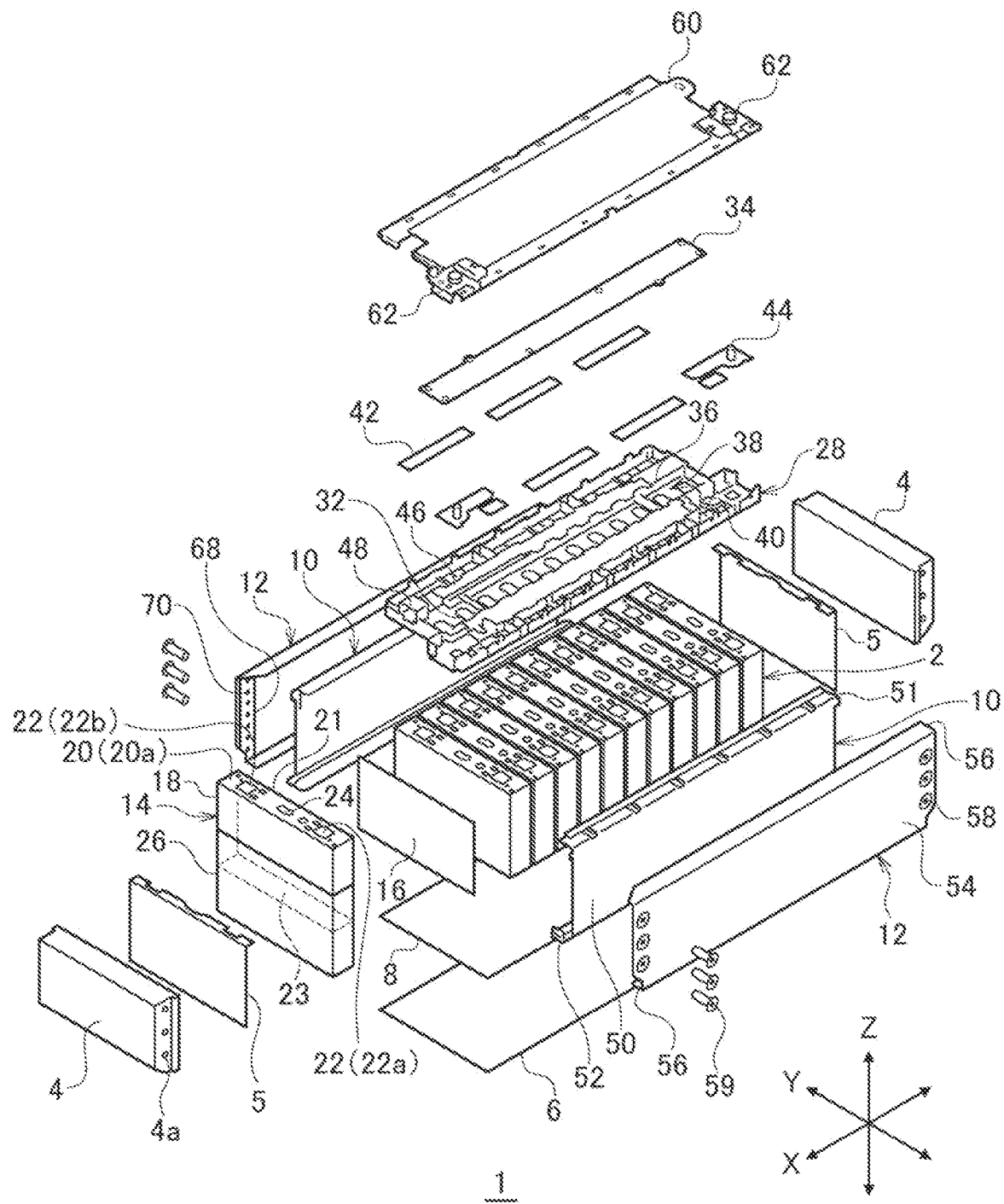
FIG. 2 is an exploded perspective view of the battery module.

FIG. 1 is a perspective view of a battery module according to an exemplary embodiment. FIG. 2 is an exploded perspective view of the battery module. In FIG. 1, the structure of side separator 10 is illustrated in a simplified form. Battery module 1 includes battery stack 2, a pair of end plates 4, cooling plate 6, heat conductive layer 8, side separators 10, and constraining members 12.

Battery stack 2 includes a plurality of batteries 14 and inter-cell separators 16. Each battery 14 is a chargeable secondary battery such as a lithium ion battery, a nickel-hydrogen battery, or a nickel-cadmium battery, for example. Each battery 14 is a so-called prismatic battery, and has exterior can 18 having a flat rectangular parallelepiped shape. Exterior can 18 has a substantially rectangular opening not shown in the drawings on one surface of exterior can 18. An electrode assembly, an electrolyte and the like are housed in exterior can 18 through the opening. Sealing plate 20 that closes the opening of exterior can 18 is disposed in the opening.

Output terminal 22 of a positive electrode is disposed on sealing plate 20 at a position close to one end of sealing plate 20 in a longitudinal direction, and output terminal 22 of a negative electrode is disposed on sealing plate 20 at a position close to the other end of sealing plate 20 in the longitudinal direction. Therefore, sealing plate 20 forms terminal arrangement surface 20a that the pair of output terminals 22 is disposed on. The pair of output terminals 22 is respectively electrically connected to positive electrode plates and negative electrode plates that form the electrode assembly. Hereinafter, output terminal 22 of the positive electrode is referred to as positive-electrode terminal 22a, and output terminal 22 of the negative electrode is referred to as negative-electrode terminal 22b as appropriate. When there is no need to distinguish polarities of output terminals 22 from each other, positive-electrode terminal 22a and negative-electrode terminal 22b are collectively referred to as output terminals 22.

Exterior can 18, sealing plate 20, and output terminals 22 are electric conductors and are made of metal, for example. Sealing plate 20 and the opening of exterior can 18 are joined to each other by, for example, laser welding. For enabling such joining, battery 14 has joint portion 21 that fixes the opening of exterior can 18 and a peripheral edge of sealing plate 20. Respective output terminals 22 are inserted into through holes (not illustrated) formed in sealing plate 20. A seal member (not illustrated) having insulating property is interposed between respective output terminals 22 and respective through holes. Each battery 14 has bottom surface 23 that is disposed on a side opposite to terminal arrangement surface 20a.

In the present exemplary embodiment, for convenience sake of description, terminal arrangement surface 20a is referred to as an upper surface of battery 14, and bottom surface 23 is referred to as a lower surface of battery 14. Therefore, terminal arrangement surface 20a is positioned vertically above bottom surface 23, and bottom surface 23 is positioned vertically below terminal arrangement surface 20a. Battery 14 has two main surfaces that connect the upper surface and the lower surface to each other. The main surfaces are surfaces that have the largest area among six surfaces of battery 14. The main surfaces are a long side surfaces that are connected to long sides of the upper surface and long sides of the lower surface. Two remaining surfaces other than the upper surface, the lower surface, and two main surfaces are referred to as side surfaces of battery 14. These side surfaces are short side surfaces that are connected to short sides of the upper surface and short sides of the lower surface.

For convenience sake of description, in battery stack 2, a surface of battery stack 2 on an upper surface side of batteries 14 is referred to as an upper surface of battery stack 2, a surface of battery stack 2 on a lower surface side of batteries 14 is referred to as a lower surface of battery stack 2, and surfaces of battery stack 2 on short side surface sides of battery 14 are referred to as side surfaces of battery stack 2. These directions and positions are defined for convenience sake. Therefore, for example, the portion defined as the upper surface in the present invention does not always mean that the portion defined as the upper surface is positioned above the portion defined as the lower surface.

In sealing plate 20, valve portion 24 is disposed between the pair of output terminals 22. Valve portion 24 is also referred to as a safety valve and is a mechanism for releasing a gas in battery 14. Valve portion 24 is configured to release an internal gas by opening valve portion 24 when an internal pressure of exterior can 18 is increased to a predetermined value or more. For example, valve portion 24 is formed of: a thin wall portion that is formed on a portion of sealing plate 20 and is thinner than other portions of valve portion 24; and a linear groove formed on a surface of the thin wall portion. In this configuration, when an internal pressure of exterior can 18 increases, valve portion 24 is opened by tearing the thin wall portion with the groove as a tearing starting point. Valve portions 24 of respective batteries 14 are connected to exhaust duct 38 described later, and a gas in the battery is discharged from valve portion 24 to be exhausted to duct 38.

Each battery 14 has insulating film 26. Insulating film 26 is, for example, a cylindrical shrink tube, and is heated after exterior can 18 is made to pass through insulating film 26. Accordingly, insulating film 26 shrinks and covers two main surfaces, two side surfaces, and bottom surface 23 of exterior can 18. Insulating film 26 can prevent a short circuit between batteries 14 disposed adjacently to each other or between battery 14 and end plate 4.

The plurality of batteries 14 are stacked to each other at a predetermined interval such that the main surfaces of batteries 14 disposed adjacently to each other face each other. The term "stack" means that a plurality of members are arranged in any one direction. Therefore, stacking of batteries 14 also includes an arrangement of the plurality of batteries 14 in a horizontal direction. In the present exemplary embodiment, batteries 14 are horizontally stacked. Accordingly, stacking direction X of batteries 14 is a direction extending horizontally. Hereinafter, when appropriate, a direction that is horizontal and is perpendicular to stacking direction X is referred to as horizontal direction Y, and a direction that is perpendicular to stacking direction X and horizontal direction Y is referred to as vertical direction Z.

Each battery 14 is disposed such that output terminals 22 are directed in the same direction. In this exemplary embodiment, each battery 14 is disposed such that output terminals 22 are directed upward in the vertical direction. Two batteries 14 disposed adjacently to each other are stacked such that positive-electrode terminal 22a of one battery 14 and negative-electrode terminal 22b of another battery 14 are disposed adjacently to each other. In this state, the pair of output terminals 22 of each battery 14 is arranged in horizontal direction Y, and terminal arrangement surface 20a and bottom surface 23 of each battery 14 are arranged in vertical direction Z.

Inter-cell separator 16 is also referred to as an insulating spacer, and is formed of a resin sheet having an insulating property, for example. As examples of the resin that are used for forming inter-cell separator 16, thermoplastic resins such as polypropylene (PP), polybutylene terephthalate (PBT), polycarbonate (PC), and Noryl (registered trademark) resin (modified PPE) are named. Inter-cell separator 16 is disposed between two batteries 14 disposed adjacently to each other and electrically insulates two batteries 14 from each other.

Battery stack 2 is sandwiched between the pair of end plates 4. The pair of end plates 4 is disposed at both ends of battery stack 2 in stacking direction X that batteries 14 are stacked along. The pair of end plates 4 is disposed adjacently to batteries 14 positioned at both ends of battery stack 2 in stacking direction X with outer end separator 5 interposed between the end plate and battery 14. Outer end separator 5 can be made of the same resin material as inter-cell separator 16. Each end plate 4 is a metal plate made of metal such as iron, stainless steel, or aluminum. By interposing outer end separator 5 between end plate 4 and battery 14, end plate 4 and battery 14 are insulated from each other.

Each end plate 4 has fastening holes 4a on two surfaces that are directed in horizontal direction Y. In the present exemplary embodiment, three fastening holes 4a are disposed at a predetermined interval in vertical direction Z. The surface where fastening holes 4a are formed faces flat surface portion 54 of constraining member 12. Flat surface portion 54 will be described later.

Bus bar plate 28 is placed on the upper surface of battery stack 2. Bus bar plate 28 is a plate-like member that covers terminal arrangement surfaces 20a of the plurality of batteries 14. Bus bar plate 28 has a plurality of opening portions 32 that valve portions 24 are exposed through at positions corresponding to valve portions 24 of respective batteries 14. Bus bar plate 28 includes: duct top plate 34 that covers opening portions 32 from above; and side walls 36 that surround the sides of opening portions 32. By fixing duct top plate 34 to upper ends of side walls 36, exhaust duct 38 is formed in bus bar plate 28. Respective valve portions 24 communicate with exhaust duct 38 via opening portions 32.

Bus bar plate 28 has opening portions 40 that output terminals 22 are exposed through at positions corresponding to output terminals 22 of respective batteries 14. Bus bars 42 are placed on respective opening portions 40. The plurality of bus bars 42 are supported by bus bar plate 28. Positive-electrode terminal 22a and negative-electrode terminal 22b of batteries 14 that are disposed adjacently to each other are electrically connected to each other by bus bar 42 placed in respective opening portions 40.

Bus bar 42 is a substantially strip-shaped member made of metal such as copper or aluminum. One end portion of bus bar 42 is connected to positive-electrode terminal 22a of one battery 14, and the other end portion is connected to negative-electrode terminal 22b of another battery 14. With respect to bus bars 42, output terminals 22 having the same polarity in a plurality of batteries 14 disposed adjacently to each other may be connected in parallel to each other to form a battery block, and these battery blocks may be connected to each other in series by bus bars 42.

Bus bars 42 connected to output terminals 22 of batteries 14 positioned at both ends in stacking direction X have external connection terminals 44. External connection terminals 44 are electrically connected to terminal portions 62 of top cover 60 described later. External connection terminals 44 are connected to an external load (not illustrated) via terminal portions 62. Voltage detection line 46 is placed on bus bar plate 28. Voltage detection line 46 is electrically connected to the plurality of batteries 14 to detect voltages of respective batteries 14. Voltage detection line 46 includes a plurality of conductive wires (not illustrated). One end of each conductive wire is connected to each bus bar 42, and the other end is connected to connector 48. Connector 48 is connected to an external battery ECU (not illustrated) or the like. Battery ECU controls detection of a voltage or the like of each battery 14, charging and discharging of each battery 14, and the like.

Cooling plate 6 is made of a material having high thermal conductivity such as aluminum. Cooling plate 6 is thermally connected to battery stack 2. That is, cooling plate 6 is connected to battery stack 2 in a heat-exchangeable manner, and cools respective batteries 14. In the present exemplary embodiment, battery stack 2 is placed on a main surface of cooling plate 6. Battery stack 2 is placed on cooling plate 6 such that a lower surface of battery stack 2 faces a cooling plate 6. Accordingly, battery stack 2 and cooling plate 6 are arranged in vertical direction Z. Cooling plate 6 may be connected to an object disposed outside of battery module 1, for example, a vehicle body of a vehicle that battery module 1 is mounted on or the like, in a heat-exchangeable manner. In cooling plate 6, a flow path that a refrigerant such as water or ethylene glycol flows through may be disposed. With such a configuration, heat exchange efficiency between battery stack 2 and cooling plate 6 can be further enhanced and, eventually, cooling efficiency of battery 14 can be further enhanced.

In the present exemplary embodiment, heat conductive layer 8 having insulating property is interposed between battery stack 2 and cooling plate 6. That is, cooling plate 6 is thermally connected to battery stack 2 via heat conductive layer 8. Heat conductive layer 8 covers the entire bottom surface of battery stack 2. The thermal conductivity of heat conductive layer 8 is higher than the thermal conductivity of air. Heat conductive layer 8 can be formed of, for example, a known resin sheet having good thermal conductivity, such as an acrylic rubber sheet or a silicone rubber sheet, for example.

By interposing heat conductive layer 8 between battery stack 2 and cooling plate 6, cooling efficiency of respective batteries 14 can be enhanced, and respective batteries 14 can be more uniformly cooled. Since heat conductive layer 8 has an insulating property, it is possible to prevent battery stack 2 and cooling plate 6 from being electrically connected to each other. Heat conductive layer 8 can suppress deviation of battery stack 2 and cooling plate 6 in a direction perpendicular to the arrangement direction of battery stack 2 and cooling plate 6. In the present exemplary embodiment, battery stack 2 and cooling plate 6 are arranged in vertical direction Z and hence, the deviation of battery stack 2 and cooling plate 6 in the extending direction of an XY plane can be suppressed by heat conductive layer 8.

Side separators 10 are members that have an insulating property and insulate constraining members 12 and battery stack 2 from each other. In the present exemplary embodiment, the pair of side separators 10 is arranged in horizontal direction Y. Each side separator 10 has a long shape elongated in stacking direction X of batteries 14. Battery stack 2, the pair of end plates 4, cooling plate 6, and heat conductive layer 8 are disposed between the pair of side separators 10. Each side separator 10 is made of, for example, a resin having an insulating property. As a resin that is used for forming side separator 10, in the same manner as inter-cell separator 16, thermoplastic resins such as polypropylene (PP), polybutylene terephthalate (PBT), polycarbonate (PC), and Noryl (registered trademark) resin (modified PPE) are named.

Figure 3:
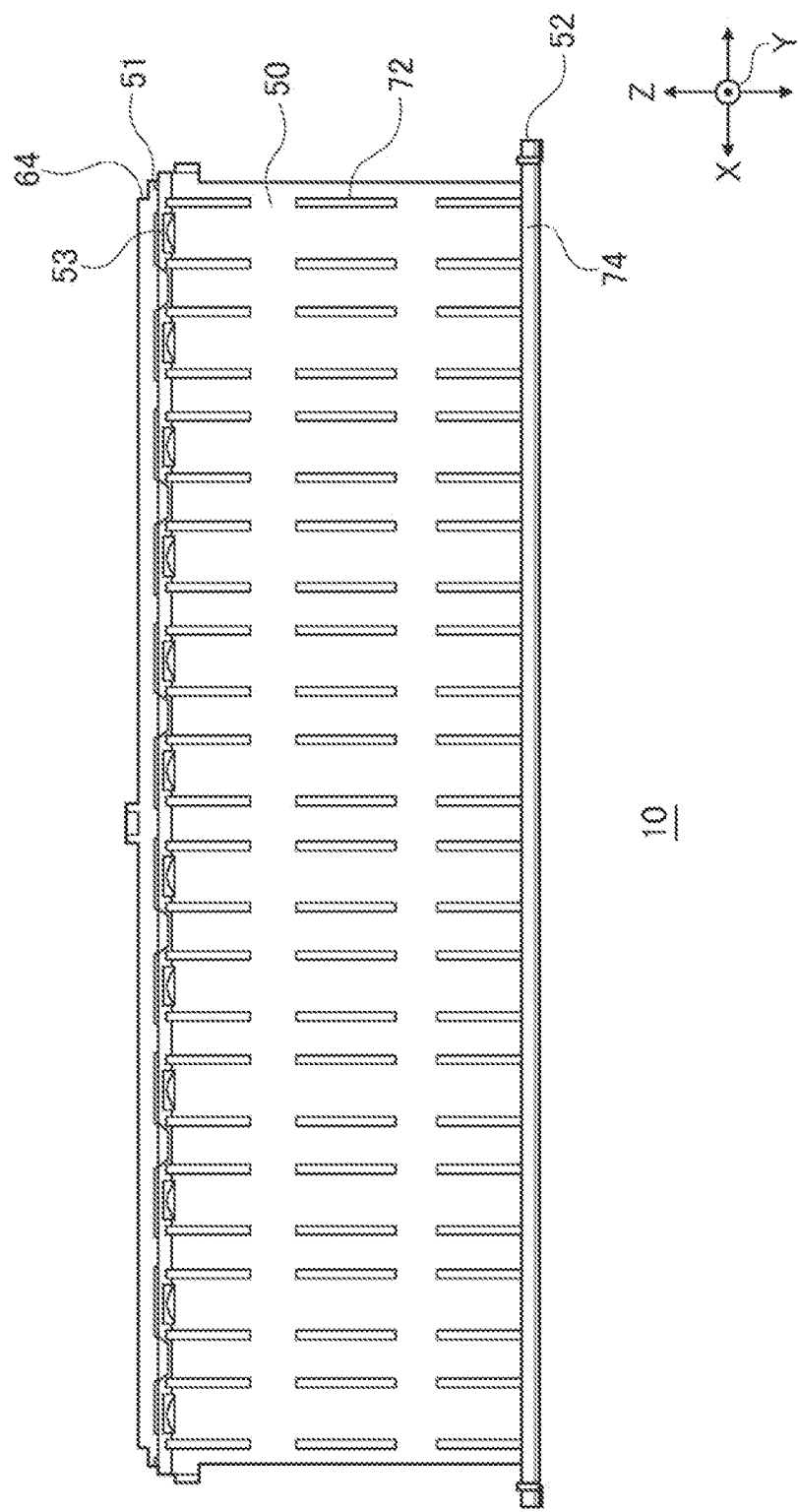
FIG. 3 is a view of a side separator as viewed in a horizontal direction.

Side separator 10 of the present exemplary embodiment has first portion 50, second portion 51, third portion 52, and biasing portions 53 (see FIG. 3 and the like). First portion 50 has a rectangular flat plate shape, and extends in stacking direction X of batteries 14 along a side surface of battery stack 2. Second portion 51 has a strip shape extending in stacking direction X, and protrudes from one end portion region of first portion 50 in a first direction toward battery stack 2 (the inside of battery module 1 in horizontal direction Y). Third portion 52 has a strip shape extending in stacking direction X, and protrudes from the other end portion region of first portion 50 in the first direction toward battery stack 2.

The "first direction" is an in-plane direction of flat surface portion 54 described later, and is a direction that intersects with stacking direction X. In the present exemplary embodiment, flat surface portion 54 extends in stacking direction X and vertical direction Z. Accordingly, the in-plane direction of flat surface portion 54 is the extending direction of an XZ plane. Therefore, the first direction that is the extending direction of the XZ plane and intersects with stacking direction X is vertical direction Z. In the present exemplary embodiment, one end portion region is an end portion region on an upper side of flat surface portion 54 in the vertical direction, and the other end portion region is an end portion region on a lower side of flat surface portion 54 in the vertical direction. In the present exemplary embodiment, second portion 51 protrudes from an upper end of first portion 50 toward battery stack 2, and third portion 52 protrudes from a lower end of first portion 50 toward battery stack 2. The structure of biasing portions 53 will be described in detail later.

Constraining members 12 are also referred to as bind bars, and are long members that are elongated in stacking direction X of batteries 14. In the present exemplary embodiment, the pair of constraining members 12 is arranged in horizontal direction Y. Each constraining member 12 is made of metal. As examples of metal used for forming constraining member 12, iron, stainless steel and the like are named. Battery stack 2, the pair of end plates 4, cooling plate 6, heat conductive layer 8, and the pair of side separators 10 are disposed between the pair of constraining members 12.

In the present exemplary embodiment, constraining member 12 includes flat surface portion 54 and a pair of arm portions 56. Flat surface portion 54 has a rectangular shape, and extends in stacking direction X along a side surface of battery stack 2. The pair of arm portions 56 protrude toward battery stack 2 from end portion regions of flat surface portion 54 on both ends in vertical direction Z. That is, one arm portion 56 protrudes from an upper side of flat surface portion 54 toward battery stack 2, and the other arm portion 56 protrudes from a lower side of flat surface portion 54 toward battery stack 2. Accordingly, the pair of arm portions 56 faces each other in the arrangement direction of battery stack 2 and cooling plate 6. Battery stack 2, cooling plate 6, heat conductive layer 8, and side separators 10 are disposed between the pair of arm portions 56.

Contact plate 68 is fixed to regions of flat surface portion 54 that face respective end plates 4 by welding or the like. Contact plate 68 is a member that is elongated in vertical direction Z. Through holes 70 are formed in contact plate 68 in horizontal direction Y in a penetrating manner at positions that correspond to fastening holes 4a formed in end plate 4. Through holes 58 are formed in flat surface portion 54 in horizontal direction Y in a penetrating manner at positions that correspond to through holes 70 formed in contact plate 68.

By making the pair of end plates 4 engage with flat surface portions 54 of respective constraining members 12, the plurality of batteries 14 are sandwiched between end plates 4 in stacking direction X. Specifically, battery stack 2 is formed by alternately arranging the plurality of batteries 14 and the plurality of inter-cell separators 16, and such battery stack 2 is sandwiched between the pair of end plates 4 in stacking direction X with outer end separators 5 interposed between battery stack 2 and end plates 4. Heat conductive layer 8 is disposed below the lower surface of battery stack 2, and cooling plate 6 is disposed so as to face battery stack 2 with heat conductive layer 8 interposed between cooling plate 6 and battery stack 2. In such a state, battery stack 2, the pair of end plates 4, cooling plate 6, and heat conductive layer 8 are sandwiched between the pair of side separators 10 in horizontal direction Y. Further, the pair of constraining members 12 sandwich the whole body in horizontal direction Y from the outside of the pair of side separators 10.

The pair of end plates 4 and the pair of constraining members 12 are aligned with each other such that fastening holes 4a, through holes 70, and through holes 58 overlap with each other. Fastening members 59 such as screws are made to pass through through holes 58 and through holes 70 and are made to threadedly engage with fastening holes 4a. With such a configuration, the pair of end plates 4 and the pair of constraining members 12 are fixed to each other. By making the pair of end plates 4 and the pair of constraining members 12 engage with each other, the plurality of batteries 14 are fastened to each other and are constrained in stacking direction X. Accordingly, respective batteries 14 are positioned in stacking direction X.

Constraining members 12 sandwich the plurality of batteries 14 in stacking direction X. Constraining members 12 also sandwich battery stack 2, heat conductive layer 8, and cooling plate 6 in the arrangement direction of battery stack 2, heat conductive layer 8, and cooling plate 6. Specifically, constraining members 12 sandwich the plurality of batteries 14 in stacking direction X in such a manner that both end portions of flat surface portions 54 of constraining members 12 in stacking direction X of batteries 14 engage with the pair of end plates 4. Battery stack 2, heat conductive layer 8, and cooling plate 6 are sandwiched between the pair of arm portions 56 of constraining members 12 in vertical direction Z (see FIG. 6). That is, constraining members 12 have both a function of fastening the plurality of batteries 14 and a function of fastening battery stack 2 and cooling plate 6. Therefore, unlike the conventional structure, battery stack 2 and cooling plate 6 are not fastened by screws.

In a state where battery stack 2, heat conductive layer 8, and cooling plate 6 are sandwiched by the pair of arm portions 56 in vertical direction Z, heat conductive layer 8 is elastically deformed or plastically deformed by being pressed by battery stack 2 and cooling plate 6. Consequently, it is possible to obtain thermal connection between battery stack 2 and cooling plate 6 with more certainty. In addition, entire battery stack 2 can be cooled uniformly. Further, deviation of battery stack 2 and cooling plate 6 in the XY plane directions can be further suppressed.

As an example, after the assembling of these constituent elements is completed, bus bar plate 28 is placed on battery stack 2. Then, bus bars 42 are attached to output terminals 22 of respective batteries 14 so as to electrically connect output terminals 22 of the plurality of batteries 14 to each other. For example, bus bars 42 are fixed to output terminals 22 by welding.

Top cover 60 is stacked on an upper surface of bus bar plate 28. Top cover 60 prevents dew condensation water, dust, or the like from being in contact with output terminals 22, valve portions 24, bus bars 42, or the like of batteries 14. Top cover 60 is made of a resin having an insulating property, for example. Top cover 60 has terminal portions 62 at positions that overlap with the external connection terminals 44 in vertical direction Z. Top cover 60 is fixed to bus bar plate 28 by, for example, snap-fitting. External connection terminals 44 and terminal portions 62 are connected to each other in a state where top cover 60 is placed on bus bar plate 28.

Figure 4:
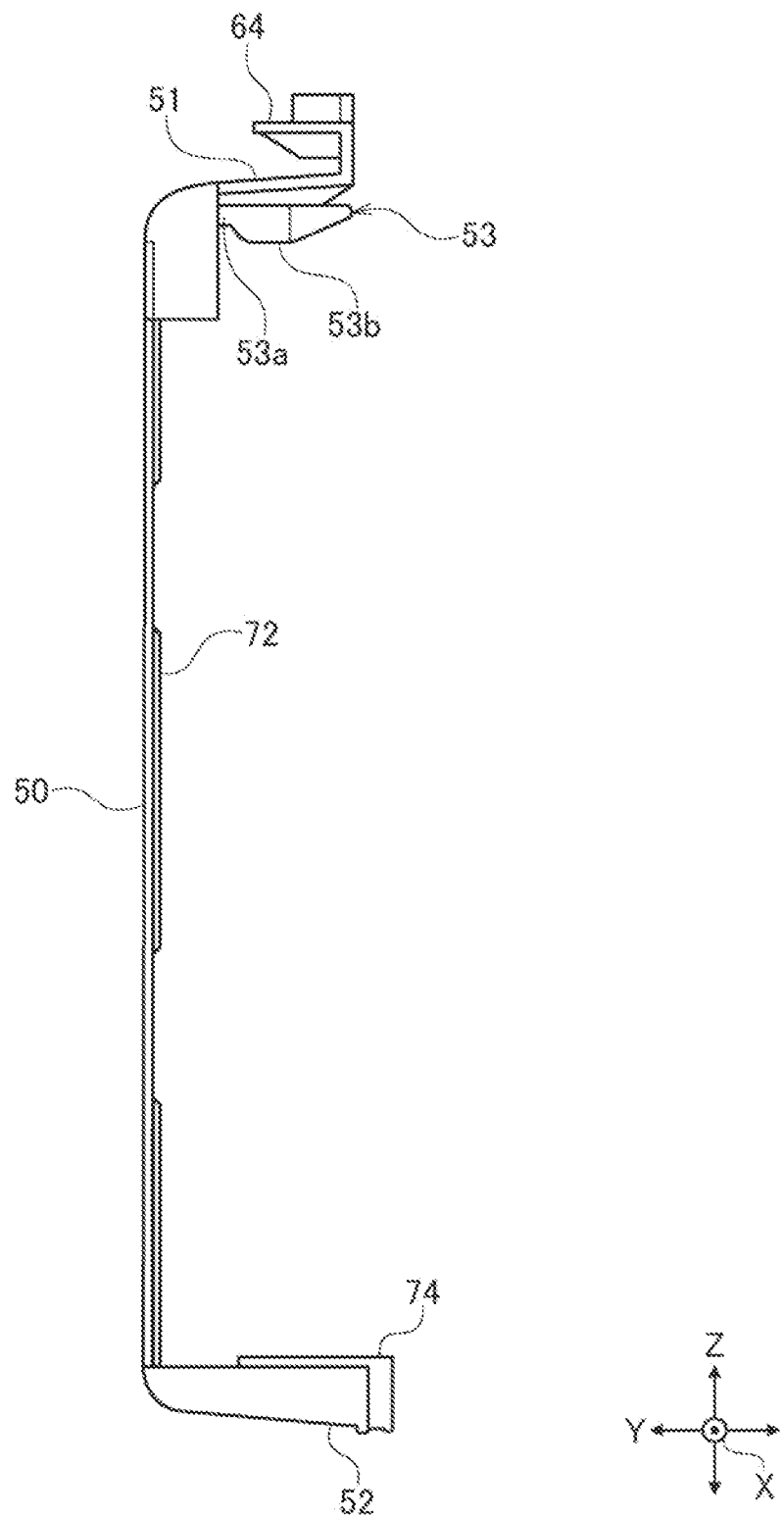
FIG. 4 is a view of the side separator as viewed in a stacking direction.
Figure 5:
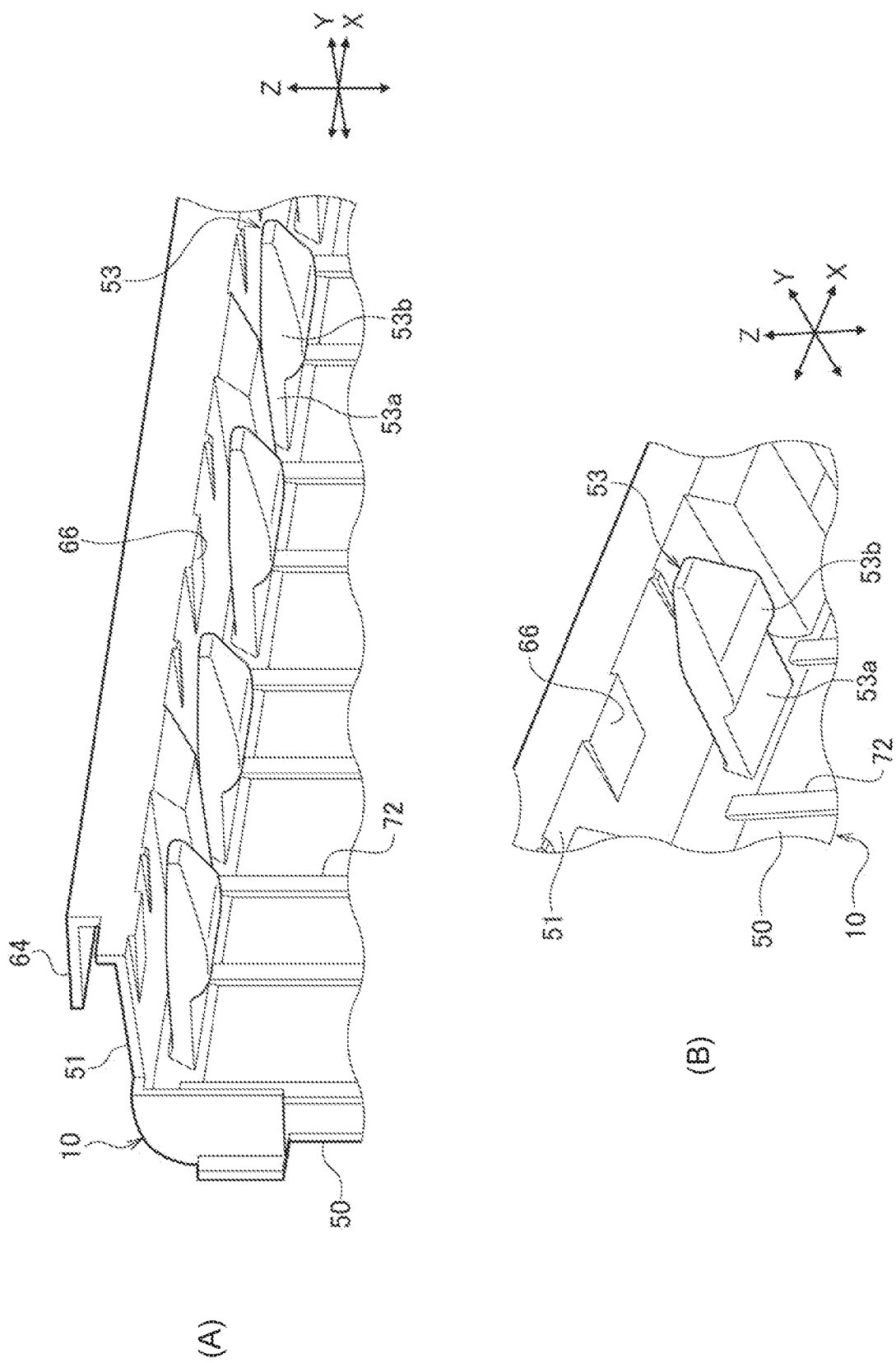
FIGS. 5(A) and 5(B) are enlarged perspective views illustrating a region including biasing portions of the side separator.
Figure 6:
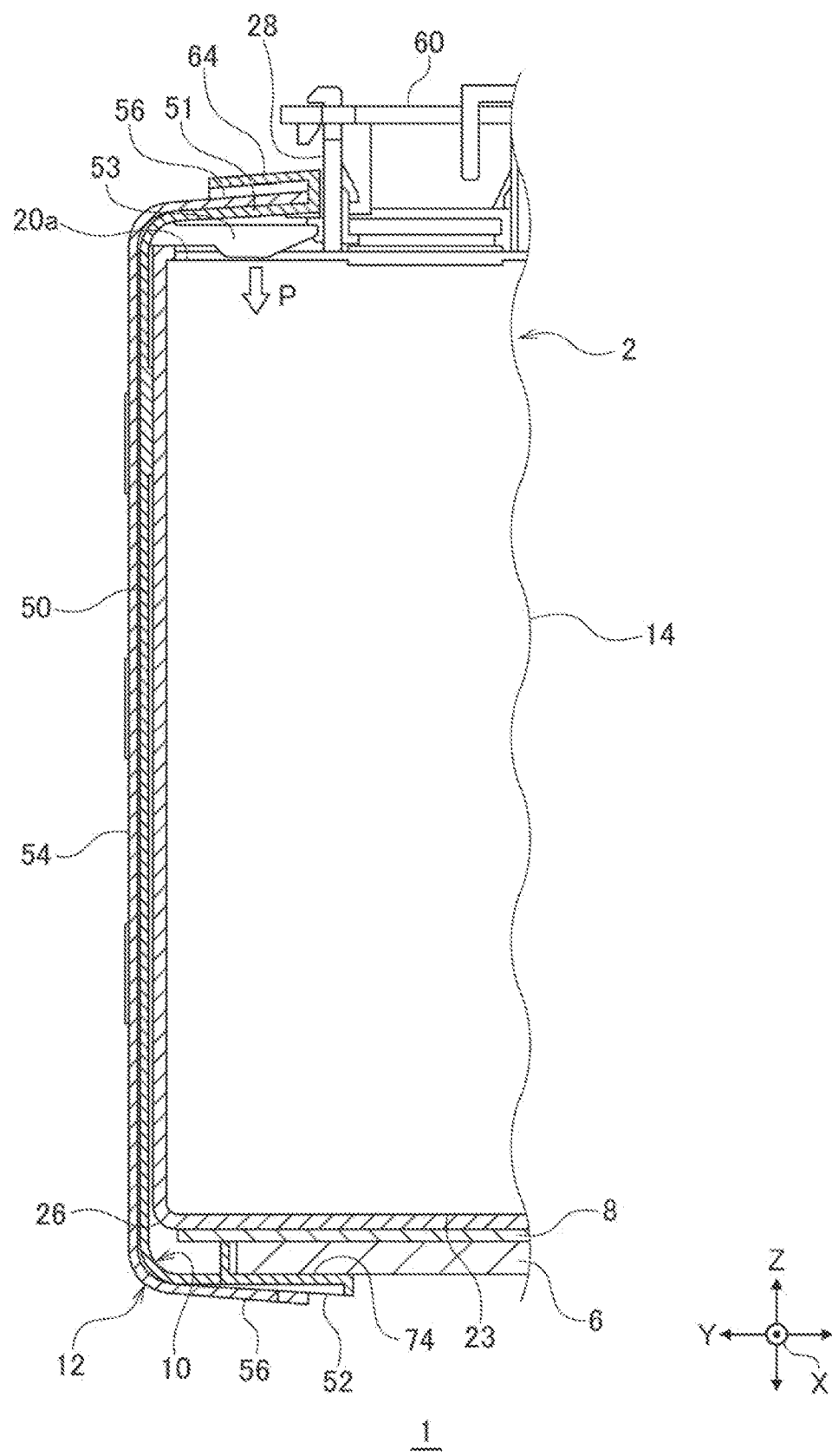
FIG. 6 is an enlarged cross-sectional view illustrating a region including the side separator of the battery module.
Figure 7:
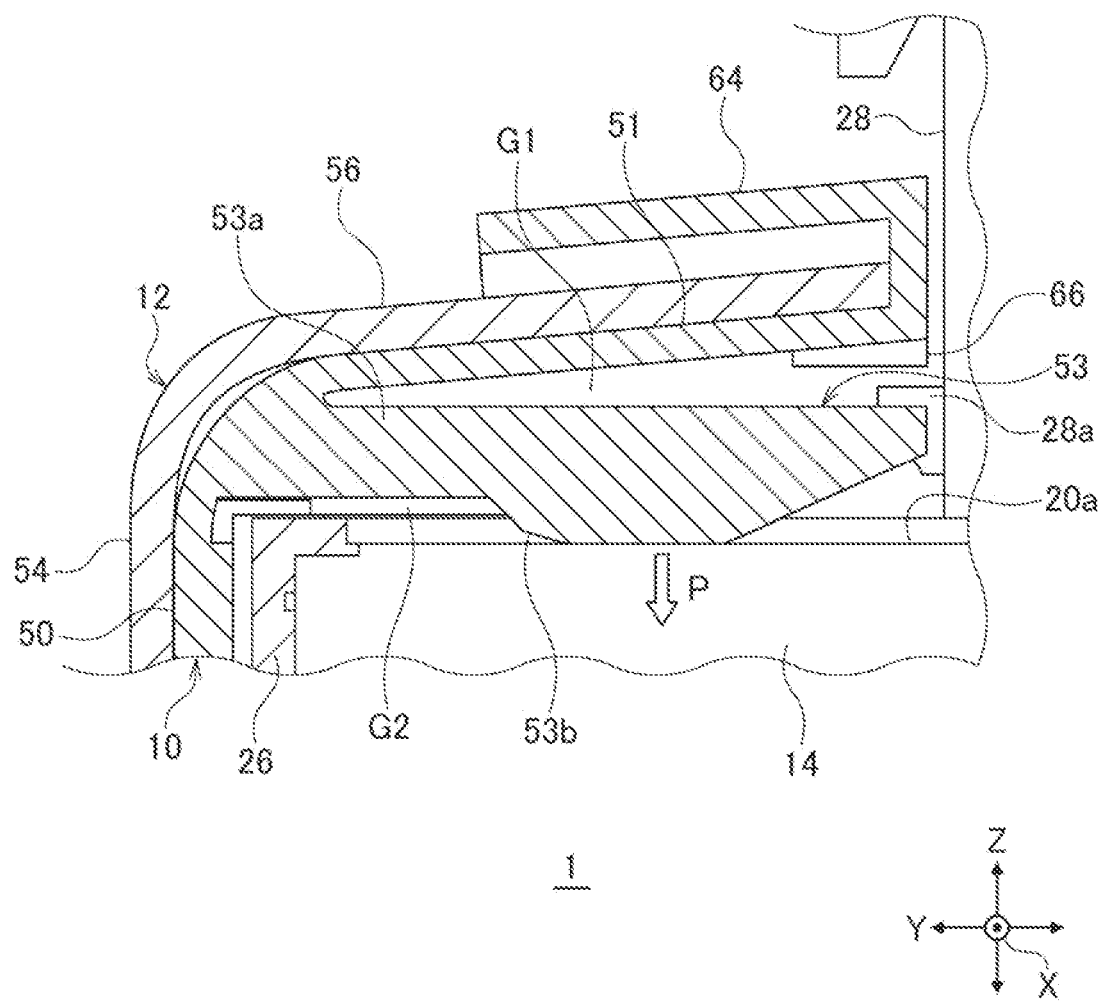
FIG. 7 is an enlarged cross-sectional view illustrating a region including a biasing portion of the battery module.

FIG. 3 is a view of side separator 10 as viewed in horizontal direction Y. FIG. 4 is a view of side separator 10 as viewed in stacking direction X. FIGS. 5(A) and 5(B) are enlarged perspective views illustrating a region that includes biasing portions 53 of side separator 10. FIG. 6 is an enlarged cross-sectional view illustrating a region that includes side separator 10 of battery module 1. FIG. 7 is an enlarged cross-sectional view illustrating a region that includes biasing portion 53 of battery module 1. In FIG. 6 and FIG. 7, illustration of an internal structure of battery 14 is omitted.

As described above, side separator 10 includes first portion 50, second portion 51, third portion 52, and biasing portions 53. First portion 50 extends in stacking direction X of batteries 14 along a side surface of battery stack 2. Flat surface portion 54 of constraining member 12 extends in stacking direction X along the side surface of battery stack 2 outside first portion 50. Therefore, first portion 50 is interposed between the side surface of battery stack 2 and flat surface portion 54 of constraining member 12. With such a configuration, the side surfaces of respective batteries 14 and flat surface portion 54 are electrically insulated from each other.

Protrusions 72 that protrude toward the side surfaces of batteries 14 are formed on a surface of first portion 50 that faces battery stack 2. In the present exemplary embodiment, strip-shaped protrusions 72 elongated in vertical direction Z are arranged in a matrix array at a predetermined interval in stacking direction X and at a predetermined interval in vertical direction Z. Respective protrusions 72 abut on side surfaces of respective batteries 14 in a state where side separator 10 is assembled to battery stack 2. With such a configuration, gaps are formed between respective batteries 14 and first portion 50.

Water formed on an upper surface of battery 14 due to dew condensation or the like flows down for a lower surface of battery 14 along gaps formed between battery 14 and first portion 50 due to gravity. There is a possibility that water flowing for the lower surface of battery 14 adheres to lower arm portions 56 of constraining members 12, cooling plate 6, and the like. When the gap formed between the side surface of each battery 14 and first portion 50 is large enough to cause movement of water due to a capillary phenomenon, there is a possibility that water flowing down for the lower surface of battery 14 extends and spreads upward in the gap due to the capillary phenomenon. In this case, there is a possibility that an electrical conductive path is formed between output terminal 22 and the lower portion of constraining member 12 or cooling plate 6 via water, and these constituent elements are short-circuited. In order to prevent such a short circuit, the gap formed between each battery 14 and first portion 50 is set to a size that suppresses movement of water due to a capillary phenomenon.

Second portion 51 protrudes from the upper end of first portion 50 toward battery stack 2. Second portion 51 extends with a predetermined gap formed between second portion 51 and the upper surface of battery stack 2, in other words, terminal arrangement surfaces 20a of batteries 14 in vertical direction Z. Arm portion 56 that protrudes from the upper end of flat surface portion 54 of constraining member 12 extends along the upper surface of battery stack 2 outside second portion 51. Therefore, second portion 51 is interposed between the upper surface of battery stack 2 and one arm portion 56 of constraining member 12, namely, arm portion 56 on an upper side of flat surface portion 54. With such a configuration, respective batteries 14 and one arm portion 56 are electrically insulated from each other.

Folded-back portion 64 is formed on second portion 51. Folded-back portion 64 extends from a distal end of second portion 51 on battery stack 2 toward the outside of battery module 1 in horizontal direction Y. A predetermined space is formed between second portion 51 and folded-back portion 64 in vertical direction Z. Arm portion 56 on an upper side of constraining member 12 is inserted into the space formed between second portion 51 and folded-back portion 64. Therefore, the distal end of arm portion 56 on the upper side of constraining member 12 is wrapped by side separator 10.

Stoppers 66 are formed on second portion 51. Stopper 66 is formed of a protrusion formed on a distal end of second portion 51 close to battery stack 2. Stopper 66 protrudes toward battery 14 from a surface of second portion 51 that faces battery 14. Protrusions 28a that protrude toward the outside of battery module 1 in horizontal direction Y are formed on a surface of bus bar plate 28 that faces second portion 51. Protrusions 28a are positioned below stoppers 66. Protrusions 28a and stoppers 66 at least partially overlap with each other as viewed in vertical direction Z. When the end portion of bus bar plate 28 in horizontal direction Y deviates upward due to deviation or deformation of bus bar plate 28, protrusions 28a and stoppers 66 engage with each other. With such a configuration, deformation and deviation of bus bar plate 28 are restricted.

Third portion 52 protrudes from the lower end of first portion 50 toward battery stack 2, and abuts on a lower side of cooling plate 6, that is, a main surface of cooling plate 6 on a side opposite to battery stack 2. Arm portion 56 that protrudes from the lower end of flat surface portion 54 of constraining member 12 extends along the main surface of cooling plate 6 on the lower side outside third portion 52. Therefore, third portion 52 is interposed between cooling plate 6 and the other arm portion 56 of constraining member 12, that is, arm portion 56 on the lower side of flat surface portion 54. With such a configuration, cooling plate 6 and the other arm portion 56 are electrically insulated from each other.

Positioning portion 74 for positioning cooling plate 6 is formed on third portion 52. Positioning portion 74 has a recess that corresponds to the shape of an end portion of cooling plate 6 in horizontal direction Y. In a state where the pair of side separators 10 is assembled to the stacked body of battery stack 2, heat conductive layer 8, and cooling plate 6, end portions of cooling plate 6 in horizontal direction Y is fitted with positioning portions 74. Cooling plate 6 is positioned in stacking direction X and horizontal direction Y because of the fitting with positioning portions 74.

Biasing portions 53 protrude toward battery stack 2 from one end portion region of first portion 50 in vertical direction Z. In the present exemplary embodiment, biasing portions 53 protrude toward battery stack 2 from the end portion region on an upper side of first portion 50. Biasing portions 53 protrude toward battery stack 2 above the upper surface of battery stack 2. In a state where side separators 10 are assembled to battery stack 2, biasing portions 53 bias the plurality of batteries 14 toward the other end portion region of first portion 50 in vertical direction Z. That is, biasing portions 53 bias the plurality of batteries 14 downward.

In battery module 1 of the present exemplary embodiment, battery stack 2 and cooling plate 6 are arranged in vertical direction Z. Cooling plate 6 is disposed on the other end portion region of first portion 50 in vertical direction Z. That is, cooling plate 6 is disposed on a lower of first portion 50. Therefore, biasing portions 53 bias the plurality of batteries 14 toward cooling plate 6. With such a configuration, the positions of the plurality of batteries 14 are aligned with each other in vertical direction Z.

Further, in the present exemplary embodiment, biasing portions 53 have: a plurality of tongue portions 53a; and contact portions 53b formed on respective tongue portions 53a. The plurality of tongue portions 53a are arranged at a predetermined interval in stacking direction X, and protrude from first portion 50 toward battery stack 2. Contact portions 53b protrude toward battery stack 2 from surfaces of respective tongue portions 53a that face battery stack 2. Biasing portions 53 have tongue portions 53a the number of which is equal to the number of batteries 14 included in battery stack 2. Respective tongue portions 53a are disposed at positions that correspond to respective batteries 14 in stacking direction X. That is, the plurality of tongue portions 53a are arranged such that respective tongue portions 53a and respective batteries 14 overlap with each other in vertical direction Z. Respective contact portions 53b protrude from respective tongue portions 53a toward respective batteries 14, and abut on respective batteries 14.

In the present exemplary embodiment, biasing portions 53 abut on terminal arrangement surfaces 20a of respective batteries 14. Specifically, respective contact portions 53b abut on terminal arrangement surfaces 20a of respective batteries 14. Biasing portions 53 bias terminal arrangement surfaces 20a of batteries 14 in vertical direction Z. Accordingly, the positional deviations of terminal arrangement surfaces 20a of respective batteries 14 in vertical direction Z can be restricted.

Biasing portions 53 extend between second portion 51 and battery stack 2 in vertical direction Z. Gap G1 is formed between each tongue portion 53a of biasing portion 53 and second portion 51. Gap G2 is formed between respective tongue portions 53a and terminal arrangement surfaces 20a of respective batteries 14. That is, biasing portions 53 are spaced apart from second portion 51 in vertical direction Z, and only contact portions 53b abut on terminal arrangement surfaces 20a. Therefore, biasing portions 53 can be elastically deformed in vertical direction Z with proximal end portions (end portions close to a first portion 50) of tongue portions 53a as fulcrums.

Contact portions 53b are pushed up by terminal arrangement surfaces 20a of respective batteries 14 in a state where side separators 10 are assembled to battery stack 2 and hence, respective tongue portions 53a are elastically deformed in a direction that tongue portions 53a approach second portion 51. Accordingly, biasing portions 53 generate biasing force P for biasing respective batteries 14 toward cooling plate 6. That is, biasing portions 53 function as leaf springs. Since biasing force P is applied to respective batteries 14, deviations of respective batteries 14 in vertical direction Z are suppressed. When batteries 14 are about to deviate in vertical direction Z due to vibration of a vehicle or the like, biasing portions 53 are elastically deformed in vertical direction Z, and press terminal arrangement surfaces 20a while absorbing an input from batteries 14. As a result, it is possible to prevent an excessively large load from being applied to batteries 14 by biasing portions 53.

Figure 8:
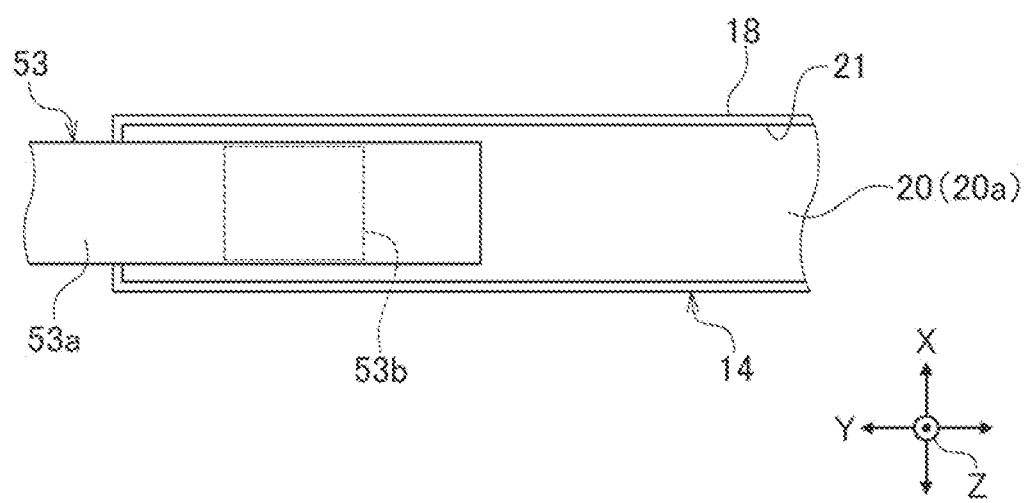
FIG. 8 is a schematic view illustrating a state where a battery and the biasing portion abut on each other.

As illustrated in FIG. 8, biasing portion 53 abuts on a region of sealing plate 20 inside joint portion 21. FIG. 8 is a schematic view illustrating a state where battery 14 and biasing portion 53 abut on each other. That is, respective contact portions 53b of biasing portions 53 are not in contact with joint portions 21 of respective batteries 14. With such a configuration, it is possible to prevent biasing force P generated by biasing portions 53 from being directly inputted to joint portions 21.

As has been described above, battery module 1 according to the present exemplary embodiment includes: battery stack 2 including the plurality of batteries 14 that are stacked to each other; constraining members 12 made of metal each having flat surface portion 54 extending in stacking direction X of batteries 14 along battery stack 2, and sandwiching the plurality of batteries 14 in stacking direction X; and side separators 10 having an insulating property and insulating constraining members 12 and battery stack 2 from each other. Side separator 10 includes: first portion 50 that extends along battery stack 2 in stacking direction X and is interposed between battery stack 2 and flat surface portion 54; and biasing portions 53 that protrude toward battery stack 2 from one end portion region of first portion 50 in the first direction that is the in-plane direction of flat surface portion 54 or first portion 50 and intersects with stacking direction X, and bias the plurality of batteries 14 toward the other end portion region of first portion 50 in the first direction.

As described above, by biasing respective batteries 14 by biasing portions 53 of side separator 10, positional deviation of respective batteries 14 can be suppressed without increasing a constraining force of constraining member 12. Therefore, positional deviations of respective batteries 14 can be suppressed while suppressing an increase in load applied to respective batteries 14. In addition, since the positional deviations of respective batteries 14 can be suppressed, the electrical connection of respective batteries 14 can be maintained with more certainty and hence, the reliability of battery module 1 can be enhanced. In addition, when battery module 1 is mounted on a vehicle, it is possible to suppress occurrence of positional deviations of respective batteries 14 due to vibration of the vehicle. Therefore, it is possible to provide battery module 1 suitable for being used as a vehicle-mounted battery module. In addition, it is possible to increase the capacity of batteries 14 and battery module 1 while suppressing an increase in load and positional deviations due to expansion of respective batteries 14.

In a conventional battery module, an upper end portion of a constraining member is bent toward a battery stack, and the bent portion presses respective batteries so as to define positions of terminal forming surfaces of respective batteries. However, in the structure where the constraining member presses the batteries, even if an insulating sheet is interposed between the constraining member and the batteries, it is difficult to sufficiently ensure an insulation distance of the constraining member with respect to the batteries. On the other hand, in battery module 1 according to the present exemplary embodiment, respective batteries 14 are biased by side separators 10 having an insulating property instead of constraining member 12 made of metal. This makes it possible to suppress positional deviations of batteries 14 while ensuring an insulation distance of constraining member 12 with respect to batteries 14.

Side separator 10 inputs biasing force P to batteries 14 by elastic deformation of biasing portion 53. Accordingly, it is possible to prevent an excessively large load from being applied to batteries 14. In addition, variations in dimensions of respective batteries 14 can also be absorbed.

In addition, biasing portions 53 of the present exemplary embodiment have a plurality of tongue portions 53*a* disposed at positions corresponding to respective batteries 14 in stacking direction X, and contact portions 53*b* protruding from respective tongue portions 53*a* toward respective batteries 14 and abutting on respective batteries 14. As a result, the positions of batteries 14 can be aligned with each other with higher accuracy. In addition, variations in dimensions of batteries 14 can be absorbed with more certainty. In addition, biasing portions 53 of the present exemplary embodiment abut on terminal arrangement surfaces 20*a* of respective batteries 14. Thus, the positions of terminal arrangement surfaces 20*a* of respective batteries 14 can be aligned. Therefore, the electrical connection of respective batteries 14 can be maintained with more certainty.

Battery module 1 according to the present exemplary embodiment includes cooling plate 6 that is arranged in the first direction with battery stack 2, is disposed close to the other end portion region of first portion 50 in the first direction, and is thermally connected to battery stack 2. Biasing portions 53 bias respective batteries 14 toward cooling plate 6. With such a configuration, it is possible to stably maintain a state where respective batteries 14 are thermally connected to cooling plate 6.

In the present exemplary embodiment, battery module 1 includes heat conductive layer 8 having an insulating property that is interposed between battery stack 2 and cooling plate 6. As a result, the cooling efficiency of respective batteries 14 can be enhanced, and respective batteries 14 can be cooled uniformly. Further, it is possible to suppress deviation of battery stack 2 and deviation of cooling plate 6.

Constraining member 12 has a pair of arm portions 56 that protrude toward battery stack 2 from end portion regions on both ends of flat surface portion 54 in the first direction. The pair of arm portions 56 sandwich battery stack 2 and cooling plate 6 in the first direction. Side separator 10 includes: second portion 51 that protrudes from one (upper) end portion region of first portion 50 toward battery stack 2 and is interposed between battery stack 2 and one arm portion 56; and third portion 52 that protrudes from the other (lower) end portion region of first portion 50 toward battery stack 2 and is interposed between cooling plate 6 and the other arm portion 56. Biasing portions 53 extend between second portion 51 and battery stack 2 in the first direction.

That is, in the present exemplary embodiment, both fastening of the plurality of batteries 14 and fastening of battery stack 2 and cooling plate 6 can be realized by constraining members 12 having a simple structure. With such a configuration, the structure of battery module 1 can be simplified as compared with a case where battery stack 2 and cooling plate 6 are fastened to each other by screws. In addition, the number of parts of battery module 1 can be reduced and hence, assembling of battery module 1 can be simplified. Side separator 10 has first portion 50, second portion 51, and third portion 52. Accordingly, constraining member 12 having the pair of arm portions 56, battery stack 2, and cooling plate 6 can be insulated from each other with more certainty. Contact portions 53*b* bias batteries 14 in a space sandwiched between second portion 51 and third portion 52. With such a configuration, it is possible to increase an insulation distance between constraining member 12 and batteries 14.

Respective batteries 14 include: exterior can 18 having the opening; sealing plate 20 that closes the opening of exterior can 18 and has the pair of output terminals 22 disposed; and joint portion 21 that fix the opening of exterior can 18 and sealing plate 20 to each other. In the present exemplary embodiment, biasing portions 53 abut on a region of sealing plate 20 inside joint portions 21. With such a configuration, it is possible to prevent biasing force P from being directly inputted to joint portions 21. Accordingly, a damage to batteries 14 can be suppressed.

In the present exemplary embodiment, side separators 10 and constraining members 12 are provided as separate bodies, and side separators 10 are not fastened to constraining members 12. That is, side separator 10 and constraining member 12 are not fixed to each other. Side separator 10 is not fastened to battery stack 2 either. As a result, even if constraining members 12 are deformed due to expansion or the like of batteries 14, it is possible to suppress side separators 10 from being deformed following the deformation of constraining members 12. As a result, breakage of side separators 10 can be suppressed.

The exemplary embodiment of the present invention has been described in detail heretofore. The above-described exemplary embodiment is merely a specific example for carrying out the present invention. The contents of the exemplary embodiment do not limit the technical scope of the present invention, and many design changes such as changes, additions, and deletions of constituent elements can be made without departing from the spirit of the invention defined in claims. Novel embodiments with a design change acquire respective advantageous effects of the exemplary embodiment and modification that are combined with each other. In the above-described embodiment, with respect to the contents where such design changes are allowable, the contents are emphasized with expressions such as "of the present exemplary embodiment" and "in the present exemplary embodiment". However, the design changes are allowed even with respect to the contents without such expressions. Any combination of constituent elements included in the respective exemplary embodiments is also effective as an aspect of the present invention. Hatching applied to the cross sections in the drawings does not limit a material of the hatched object.

(First Modification)

FIG. 9 is an enlarged cross-sectional view illustrating a region including cooling plate 6 of battery module 1 according to a first modification. In FIG. 9, the illustration of an internal structure of battery 14 is omitted. The modification differs from the exemplary embodiment in that none of battery stack 2, heat conductive layer 8, and cooling plate 6 are constrained by constraining member 12. Specifically, constraining member 12 has a pair of arm portions 56 that protrude toward battery stack 2 from end portion regions on both ends of flat surface portion 54 in the first direction, and the pair of arm portions 56 sandwich battery stack 2 in the first direction (see also FIG. 6). Biasing portions 53 are disposed between one arm portion 56 and battery stack 2 (see also FIG. 7), and bias a plurality of batteries 14 toward the other arm portion 56.

That is, in the present modification, third portion 52 protrudes from the lower end of first portion 50 toward battery stack 2, and abuts on the lower surface of battery stack 2. Arm portion 56 protruding from the lower end of flat surface portion 54 of constraining member 12 extends along the lower surface of battery stack 2 outside third portion 52. Therefore, respective batteries 14 biased downward by biasing portions 53 are supported by lower arm portion 56. Even with such a structure, it is possible to prevent the plurality of batteries 14 from being positionally deviated in vertical direction Z.

(Second Modification)

Figure 10:
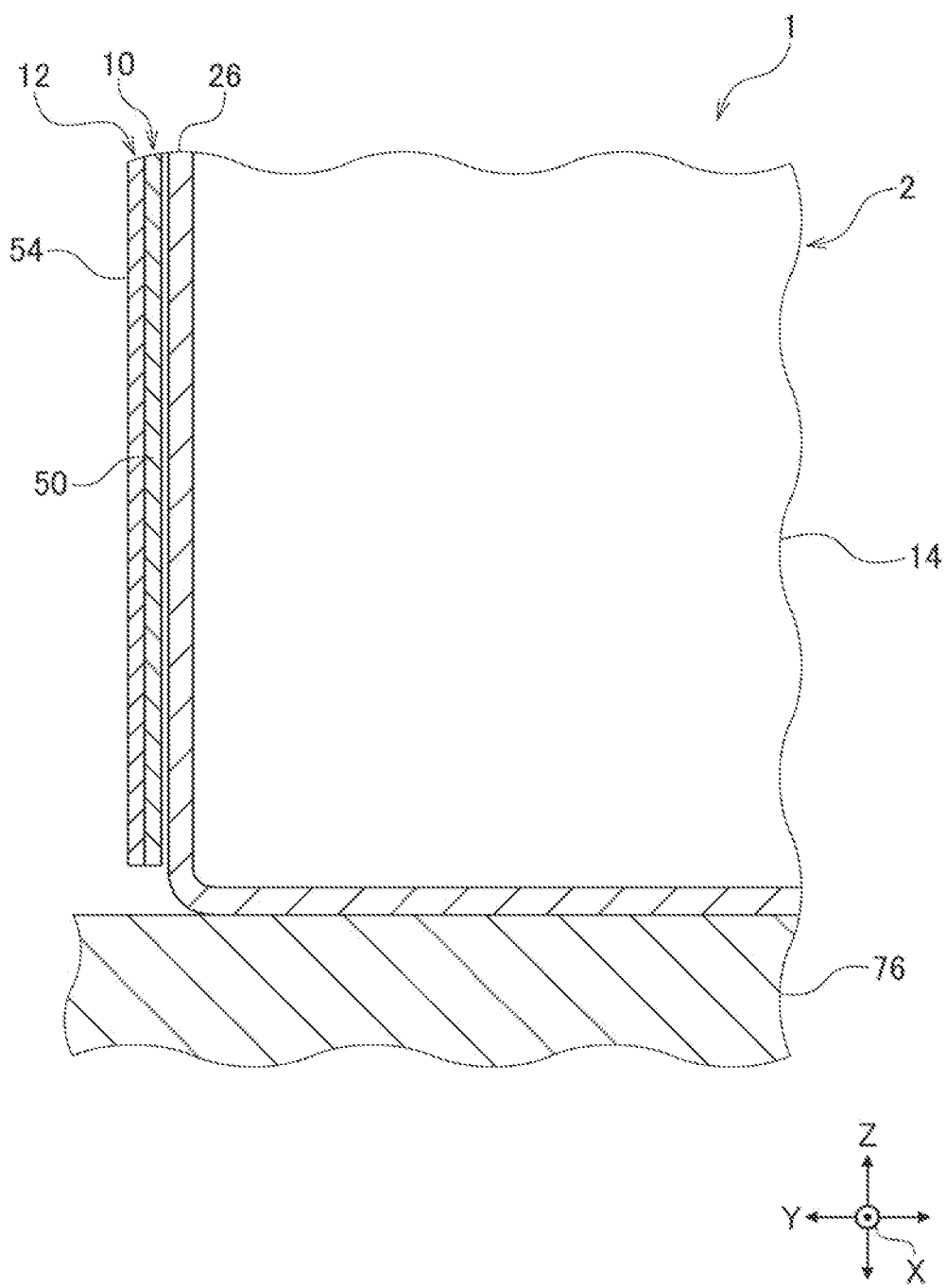
FIG. 10 is an enlarged cross-sectional view illustrating a region near a pedestal of a battery module according to a second modification.

FIG. 10 is an enlarged cross-sectional view illustrating a region near pedestal 76 of battery module 1 according to a second modification. In FIG. 10, the illustration of an internal structure of battery 14 is omitted. This modification differs from the exemplary embodiment in that battery stack 2 is placed not on cooling plate 6 but on pedestal 76. Specifically, battery stack 2 is placed on pedestal 76 such that the other end portion region in first direction faces pedestal 76 for mounting battery module 1 on pedestal 76. Biasing portions 53 bias a plurality of batteries 14 toward pedestal 76.

Constraining member 12 does not have arm portion 56 positioned near the other end portion region of first portion 50. Side separator 10 does not have third portion 52. Therefore, respective batteries 14 biased toward the other end portion region by biasing portions 53 are supported by pedestal 76. Pedestal 76 is, for example, a vehicle body of a vehicle that battery module 1 is mounted on. Also with such a structure, it is possible to prevent the plurality of batteries 14 from being positionally deviated in vertical direction Z. Also, in such a structure, pedestal 76 can function as a cooling plate. An end portion of constraining member 12 close to a pedestal 76 may be fixed to pedestal 76. An insulating sheet may be interposed between pedestal 76 and battery stack 2.

(Others)

Biasing portion 53 may abut on bottom surfaces 23 of respective batteries 14 so as to bias batteries 14 toward arm portion 56 that faces terminal arrangement surfaces 20a. Also with such a structure, the positions of terminal arrangement surfaces 20a of respective batteries 14 can be aligned. In this case, biasing portions 53 extend between third portion 52 and battery stack 2.

The number of batteries 14 that battery module 1 includes is not particularly limited. The fastening structure between end plate 4 and constraining member 12 is not particularly limited. Batteries 14 may have a cylindrical shape or the like. In a case where both heat conduction and a frictional force can be sufficiently ensured between battery stack 2 and cooling plate 6, heat conductive layer 8 may be omitted, and an insulating sheet made of PET or PC may be interposed between battery stack 2 and cooling plate 6.

REFERENCE MARKS IN THE DRAWINGS 1 battery module
2 battery stack
6 cooling plate
8 heat conductive layer
10 side separator
12 constraining member
14 battery
18 exterior can
20 sealing plate
20a terminal arrangement surface
21 joining portion
22 output terminal
23 bottom surface
50 first portion
51 second portion
52 third portion
53 biasing portion
53a tongue portion
53b contact portion
54 flat surface portion
56 arm portion
76 pedestal

The invention claimed is:

1. A battery module comprising:
a battery stack including a plurality of batteries that are stacked to each other;
constraining members that are made of metal and include a flat surface portion extending in a stacking direction of the batteries along the battery stack, the constraining members sandwiching the plurality of batteries in the stacking direction and an opposite direction of the stacking direction; and
a side separator that includes an insulating property and insulates each of the constraining members and the battery stack from each other, wherein
the side separator includes:
a first portion extending in the stacking direction along the battery stack and interposed between the battery stack and the flat surface portion;
a second portion extending in the stacking direction and protruding toward the battery stack from one end portion region of the first portion in a first direction that is an in-plane direction of the flat surface portion and intersects with the stacking direction; and
a biasing portion that protrudes toward the battery stack from the one end portion region of the first portion in the first direction, and biases the plurality of batteries toward an other end portion region of the first portion in the first direction,
wherein the biasing portion includes:
a plurality of tongue portions each disposed at a position corresponding to a corresponding one of the plurality of batteries in the stacking direction; and
contact portions each protruding from a corresponding one of the plurality of tongue portions toward a corresponding one of the plurality of batteries and abutting on the battery,
a gap is formed between each tongue portion of the biasing portion and the second portion,
each of the plurality of batteries includes: an exterior can including an opening, a sealing plate that closes the opening; and a joint portion that fixes the opening and the sealing plate to each other, and
each of the contact portions is in direct contact with a region inside the joint portion on the sealing plate of the corresponding one of the plurality of batteries.

2. The battery module according to claim 1, wherein each of the plurality of batteries includes a terminal arrangement surface that a pair of output terminals is arranged on, and a bottom surface that is disposed on a side opposite to the terminal arrangement surface, and the biasing portion abuts on the terminal arrangement surface or the bottom surface of each of the plurality of batteries.

3. The battery module according to claim 1, further comprising a cooling plate that is arranged in the first direction with the battery stack, is disposed on the other end portion region of the first portion in the first direction, and is thermally connected to the battery stack, wherein the biasing portion biases the plurality of batteries toward the cooling plate.

4. The battery module according to claim 3, further comprising a heat conductive layer including an insulating property and interposed between the battery stack and the cooling plate.

5. The battery module according to claim 3, wherein each of the constraining members includes a pair of arm portions that protrude toward the battery stack from end portion regions on both ends of the flat surface portion in the first direction, and sandwich the battery stack and the cooling plate in the first direction and the opposite direction of the first direction, and the side separator further includes: a third portion protruding from the other end portion region of the first portion toward the battery stack and interposed between the cooling plate and one of the pair of arm portions, and the biasing portion extends between the second portion and the battery stack.

6. The battery module according to claim 1, wherein each of the constraining members includes a pair of arm portions that protrudes toward the battery stack from end portion regions on both ends of the flat surface portion in the first direction and sandwiches the battery stack in the first direction and the opposite direction of the first direction, and the biasing portion is disposed between one of the pair of arm portions and the battery stack, and biases the plurality of batteries toward the other of the pair of arm portions.

7. The battery module according to claim 1, wherein the battery stack is placed on a pedestal for mounting the battery module in a state where the other end portion region in the first direction faces the pedestal, and the biasing portion biases the plurality of batteries toward the pedestal.

* * * * *